Jan. 1, 1957     C. D. WALDRON     2,775,890
FLUID FLOWMETER
Filed Jan. 20, 1954
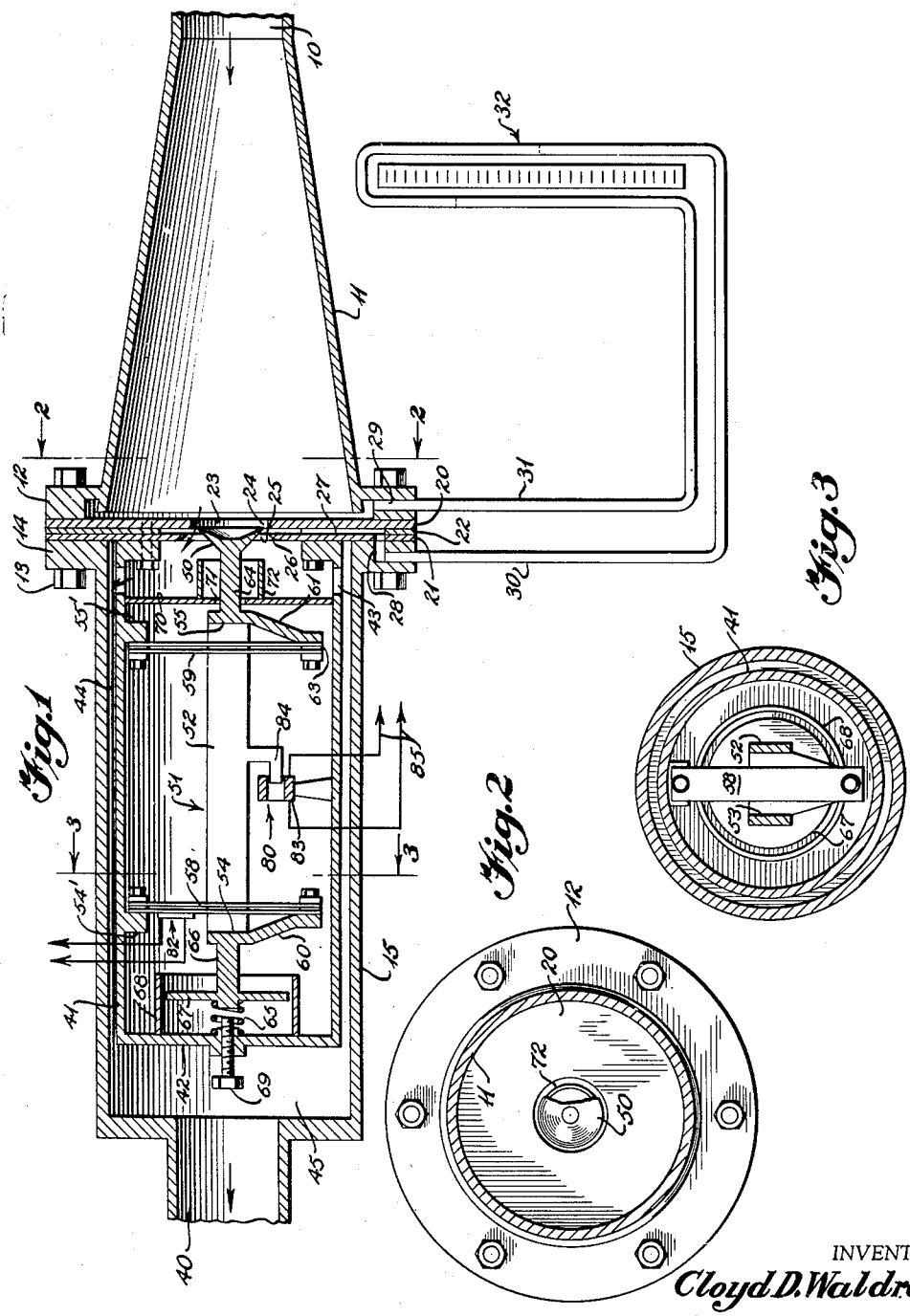
INVENTOR
Cloyd D. Waldron
BY
ATTORNEYS United States Patent Office 2,775,890
Patented Jan. 1, 1957

2,775,890

FLUID FLOWMETER

Cloyd D. Waldron, Berea, Ohio

Application January 20, 1954, Serial No. 405,266

7 Claims. (Cl. 73—207)

(Granted under Title 35, U. S. Code (1952), sec. 266)

The invention described herein may be manufactured and used by or for the Government of the United States of America for governmental purposes without the payment of any royalties thereon or therefor.

This invention relates to flowmeters for fluids.

Various devices have been used heretofore for measurement of fluid flow, but these devices have not been found fully adequate, not only as regards accuracy of determination but also as to simplicity of structure and speed of operation. For example, in the use of simple round hole orifices the range of flow is undesirably restricted; orifices with remote area adjustments are complicated and lack dependable precision; with rotameters there is a limited range of flow and glass rotameters are usable only with low pressures; flowmeters using volume rate of flow are of complicated construction; heated wire flowmeters lack precision and are influenced by deposits from the flowing liquid; spring restrained rotating vane flowmeters having bearing friction, small vane clearance for foreign material and limited pointer scale length; and spring adjusting orifices with hand indications lack precise orifice adjustment and adequate scale length. Generally stated, the present invention measures fluid flow by employing a flow chamber in which mechanical friction and viscous drag forces are reduced to exceedingly small values.

Objects of the invention are to provide flow meter apparatus permitting a high accuracy in flow determination, reducing viscous drag in the regions where measurements are determined, reducing mechanical friction operative as a flow restrictive factor or as an accuracy reducing agent, permitting an expanded range of precise flow determinations and insuring self-cleaning action in valve area.

Other objects and features of the invention will appear on consideration of the following detailed description and of the accompanying illustrative drawing in which:

Fig. 1 is a sectional view through the flowmeter apparatus;

Fig. 2 is a sectional view taken on lines 2—2 of Fig. 1; and

Fig. 3 is a sectional view taken on lines 3—3 of Fig. 1.

The inlet 10 of the flowmeter opens into a diffuser tube 11 with uniformly expanding contour. The expanded down-stream end of the diffuser is provided with an annular flange 12 which serves with bolts 13, as means of attachment to a similar flange 14 formed on the upstream end of the flowmeter casing 15. Inserted between the flanges 12 and 14 are two plates 20 and 21 of diameters the same as the flanges, these plates being separated by a spacer 22. Each plate is centrally apertured, plate 20 having an opening 23 with an axially alined edge 24 constituting the main flowmeter orifice, and plate 21 having an opening 25 having an edge 26 flared outwardly and downstream. The spacer 22 permits provision of a passageway 27, between plates 20 and 21, to angled duct 28 in the casing flange 14, this duct and duct 29 in diffuser flange 12 leading respectively to tubes 30 and 31 connecting to differential manometer 32. By this means the differential between static pressures upstream and downstream of orifice 23 may be accurately determined.

The casing 15 is shown as cylindrical in shape with the downstream end closed, except for the outlet opening 40 centrally positioned in the end wall. Within the casing 15 and spaced therefrom is a cylindrical shell 41 having its downstream end 42 closed and its open upstream end flanged inwardly and secured to inner plate 21. Annular ports 43 join the orifice 23 to the circumferential space 44, whence passage is obtained through the space 45 between the downstream ends of shell 41 and casing 15, to the outlet 40.

The shell 41, in addition to its function of defining an annular passageway serves also as a support for valve 50, movable axially in orifice 23 to vary the liquid flow therethrough. In order to provide a frictionless support for this valve, a carriage 51 is supplied in the form of two parallel bars 52, 53 joined at their ends by cross bars 54, 55 to form a loop. This loop is suspended from lugs 54', 55' at spaced points on the under side of the top of shell 41 by means of flexible devices such as flat strip springs 58 and 59 attached at their upper ends to lugs 56, 57 and at their lower ends to tongues 60 and 61 depending inwardly from the ends 54 and 55 of the carriage 51. The springs 58 and 59 may be made of single or plural strips, but in the latter case the strips are separated from each other by spacers 63 so as to prevent frictional rubbing of one strip on another.

At the forward or upstream end of the carriage loop the valve 50 is attached to cross bar 55 by means of a projecting stem 64. The valve itself is in the shape of a hollow, flattened cone, the base cone edge being sharp and lying adjacent the rim 24 of orifice 23 to permit reduced liquid flow at low pressures, but movable downstream with increased pressure against the action of support springs 58 and 59 to afford greater clearance area. Additional spring resistance is supplied when needed, by coil spring 65 rigidly attached to alined bosses fixed respectively at the center of the inner wall surface of shell end 42 and the end of a member 66 projecting downstream from cross bar 54 of carriage 51. The member 66 also carries a radial circular plate 67 forming the dash member of a dashpot 68 which is concentric to coiled spring 65 and projects inwardly beyond the free edges of dash member 67. The purpose of this dashpot 67—68 is to prevent hunting or vibration by the valve 50. A screw stop 69 serves to limit the swing of carriage 51 under pressure of liquid flow through the flowmeter.

To channel the fluid flow from orifice 23 through shell port 43 use is made of shield 70 located aft of port 43 and having a central opening 71 for inclusion of valve stems 64 and for free movement of liquid into and out of the shell interior. Flow is further controlled by a tube 72 fixed to shield 70 and also enclosing stem 64 for a section thereof between the shield and valve 50. The function of the tube and shield is to eliminate flow pressures on the valve carriage and spring supports by various changeable and unpredictable vortices or flow movements between the valve and port 43, the effect of these movements often being large and non-duplicating resulting in inaccurate metering of the instrument.

In the operation of the instrument the valve is normally in the position as shown in Fig. 1 with the flow passages of the valve at a minimum area. Liquid, for example, moving downstream, will enter the inlet 10 and under the action of diffuser 11 slow down its movement while pressure increases.

The liquid now forces its way past the sharp edge of valve 50 and is channeled by shield 70 and tube 72 directly to shell ports 43 for passage in the annular channel 44 to outlet 40. Part of the liquid initially escapes through tube 72 into the shell 41 immersing the carriage and spring suspension and conditioning dashpot 67—68 for operation to prevent valve vibration. In passing from orifice 23 to ports 43, because of the sharp valve edge and the expanding slope of plate edge 26, the viscosity drag is negligible at these points so that the static pressure as registered by manometer 32 gives a true reading of the pressure differential at the orifice.

It is particularly noteworthy that the valve carriage is completely isolated from the stream of liquid passing through the instrument so that the viscosity effects on the manometer are due solely to the fluid movement past the valve edge. This accurate indication is, of course, insured by provision of frictionless support for the carriage spring suspension, as well as elimination of friction in the valve yield springs. Sensitivity is increased by use of flat strip suspension springs in the valve carriage unit, with the flat spring face at right angles to the line of fluid pressure. Since the spring yield varies directly as the pressure the valve opening is a direct function of liquid pressure. Consequently, there may be wide variation in valve opening without disturbance of the accuracy of measurement.

It is pointed out, further, that the valve is self cleaning of foreign matter, and that by providing a closed container for the carriage and dashpot with open communication with the flow line the need for bearings for these members is eliminated. The springs are made of material which maintains a constant modulus of elasticity for temperature variation. Iso-elastic material consisting of iron 55.5%, nickel 36.0%, chromium 8.0% and molybdenum 0.5% is suitable for this use.

While the manometer 32 has been found to be satisfactory for flow indications, other devices may be employed such as the magnetic flux device 80 or the strain gauge 82. As shown, the flux device includes a coil 83 mounted within and attached to shell 41, and an armature 84 fixed to the carriage. On increased fluid pressure the armature moves deeper into the coil causing a change in the flux density and reading of the meter (not shown) connected to coil wires 85. The strain gauge 82 is the ususal device including a flexible electrically conducting strip fixed to the spring plate 58 and subject to the flexure of the spring whereby the electrical resistance is varied to indicate extent of flow.

Modifications other than indicated, coming within the scope of the invention, may of course be made, and hence no limitation to the precise showing is intended other than may be required by the claims hereto appended.

What is claimed is:

1. A flowmeter comprising a tubular structure forming a flow chamber having an inlet and outlet for fluid flow therethrough; a plate positioned across said chamber between said inlet and outlet, said plate having an orifice therethrough; a valve formed as a closure head for said orifice; valve support means permitting movement of said valve to increasingly open position with increase of fluid pressure drop across said orifice and movement to decreasingly open position with decrease of fluid pressure drop across said orifice, said support means including a rigid member attached to said valve, a shell supported within and by said structure enclosing the rigid member of said valve, and flexible connections extending between said shell and rigid member whereby said support means are free of sliding friction; and means connected to said structure and movable in accordance with the differential of pressures between the upstream and downstream sides of said plate for indicating the rate of fluid flow through said flowmeter.

2. The flowmeter as defined in claim 1, said valve head being in the shape of a hollow cone with the cone base facing upstream and terminating in a sharp edge adjacent the edge of the orifice whereby the viscosity drag of the fluid moving through the valve is reduced.

3. A flowmeter comprising a tubular structure forming a flow chamber having an inlet and outlet for fluid flow therethrough, a plate positioned across said chamber between said inlet and outlet, said plate having an orifice, a valve formed as a closure head for said orifice, flexible support devices for said valve connected to and supported by said structure within said chamber, means connected to said structure within said chamber for channelling fluid from said valve to said outlet without affecting the operation of said flexible support devices, and means connected to said structure and movable in accordance with the differential of pressures between the upstream and downstream sides of said plate for indicating the rate of fluid flow through said chamber.

4. A flowmeter for fluids comprising a tubular structure forming a flow chamber having an inlet and outlet for fluid flow therethrough, a plate positioned across said chamber between said inlet and outlet, said plate having an orifice, a valve formed as a closure head for said orifice, a carriage for said valve on the downstream side thereof, a connection between said valve and carriage, a tubular shell for enclosing said carriage and forming with said tubular structure a passageway for fluid flow therethrough, said shell being closed on the side and downstream end thereof and having a restricted opening in the upstream end enclosing said valve-carriage connector, springs suspended from said shell and fixed to said carriage for permitting axial shifting of said valve under fluid pressure, and means connected to said structure and communicating with said chamber for indicating the differential of pressure between the upstream and downstream sides of said plate.

5. The flowmeter as defined in claim 4, with said springs being in the form of flat strips, with the flat side at right angles to the direction of valve movement.

6. The flowmeter as defined in claim 5, and a coil spring attached fixedly between said carriage and the downstream end of said shell.

7. The flowmeter as defined in claim 4, and a dashpot within said shell intermediate said carriage and shell.

References Cited in the file of this patent

UNITED STATES PATENTS

| | | |
|---|---|---|
| 965,915 | Lea | Aug. 2, 1910 |
| 1,205,787 | Rosencrants | Nov. 21, 1916 |

FOREIGN PATENTS

| | | |
|---|---|---|
| 242,038 | Germany | Dec. 19, 1911 |
| 36,800 | France | Apr. 29, 1930 |
| (1st addition to 646,072) | | |